United States Patent
Rao et al.

(10) Patent No.: US 10,503,999 B2
(45) Date of Patent: Dec. 10, 2019

(54) SYSTEM FOR DETECTING SALIENT OBJECTS IN IMAGES

(71) Applicant: HRL Laboratories, LLC, Malibu, CA (US)

(72) Inventors: Shankar R. Rao, Agoura Hills, CA (US); Andras Horvath, Budapest (HU)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/946,693

(22) Filed: Apr. 5, 2018

(65) Prior Publication Data
US 2018/0307935 A1    Oct. 25, 2018

Related U.S. Application Data

(63) Continuation-in-part of application No. 15/272,247, filed on Sep. 21, 2016, which is a continuation-in-part (Continued)

(51) Int. Cl.
*G06K 9/46* (2006.01)
*G06K 9/00* (2006.01)
(Continued)

(52) U.S. Cl.
CPC ....... *G06K 9/4671* (2013.01); *G06K 9/00791* (2013.01); *G06K 9/00825* (2013.01);
(Continued)

(58) Field of Classification Search
CPC ............. G06K 9/4671; G06K 9/00805; G06K 9/00825; G06K 9/00624; G06K 9/00664;
(Continued)

(56) References Cited

U.S. PATENT DOCUMENTS 4,939,645 A * 7/1990 Hopkinson ............ G01R 33/56
                                                       378/901
5,355,435 A   10/1994 DeYong et al.
(Continued)

FOREIGN PATENT DOCUMENTS

JP    2012-234393    11/2012
WO   WO 2014/011907    1/2014

OTHER PUBLICATIONS

Yu et al., "Bottom-Up Visual Saliency Using Binary Spectrum of Walsh-Hadamard Transform" (Year: 2014).*
(Continued)

*Primary Examiner* — Kenny A Cese
(74) *Attorney, Agent, or Firm* — Tope-McKay & Associates

(57) ABSTRACT

Described is a system for detecting salient objects in images. During operation, the system maps an input image into a frequency domain having a spectral magnitude. The spectral magnitude is replaced with weights from a weight matrix W. The frequency domain is then transformed with the weights to a saliency map in the image domain, the saliency map having pixels with pixel values. A squaring operation is then performed on the saliency map by squaring the pixel values to generate a pixel-value altered saliency map. A final saliency map is generated by filtering the pixel-value altered saliency map. A number of devices may then be operated based on the saliency map.

21 Claims, 8 Drawing Sheets
(1 of 8 Drawing Sheet(s) Filed in Color)

Related U.S. Application Data of application No. 15/079,899, filed on Mar. 24, 2016, and a continuation-in-part of application No. 15/043,478, filed on Feb. 12, 2016, now Pat. No. 9,721,332, and a continuation-in-part of application No. 15/203,596, filed on Jul. 6, 2016, now Pat. No. 9,998,130.

(60) Provisional application No. 62/221,550, filed on Sep. 21, 2015, provisional application No. 62/137,665, filed on Mar. 24, 2015, provisional application No. 62/155,355, filed on Apr. 30, 2015, provisional application No. 62/516,504, filed on Jun. 7, 2017.

(51) Int. Cl.
| | |
|---|---|
| G08G 1/16 | (2006.01) |
| G08G 1/13 | (2006.01) |
| G06K 9/32 | (2006.01) |
| G06K 9/52 | (2006.01) |
| G06K 9/62 | (2006.01) |

(52) U.S. Cl.
CPC ........... *G06K 9/3233* (2013.01); *G06K 9/522* (2013.01); *G06K 9/627* (2013.01); *G08G 1/13* (2013.01); *G06K 9/00805* (2013.01); *G08G 1/164* (2013.01)

(58) Field of Classification Search
CPC ...................... G08G 1/164; G08G 1/13; G06T 2207/20164; G06T 2207/30241
See application file for complete search history.

(56) References Cited

U.S. PATENT DOCUMENTS

| | | | |
|---|---|---|---|
| 6,272,247 | B1 | 8/2001 | Manickam et al. |
| 7,403,144 | B1 | 7/2008 | Cruz-Albrecht et al. |
| 7,822,698 | B1 | 10/2010 | Cruz-Albrecht et al. |
| 8,437,543 | B2 | 5/2013 | Chamaret et al. |
| 8,996,431 | B2 | 3/2015 | Cruz-Albrecht et al. |
| 9,025,910 | B2 | 5/2015 | Liu et al. |
| 9,262,843 | B1 | 2/2016 | Cruz-Albrecht et al. |
| 9,286,268 | B2 | 3/2016 | Seeman |
| 9,721,332 | B2 | 8/2017 | Cruz-Albrecht |
| 2002/0038294 | A1 | 3/2002 | Matsugu |
| 2007/0185946 | A1* | 8/2007 | Basri ................. G06K 9/34 708/200 |
| 2009/0129696 | A1 | 5/2009 | Komatsu et al. |
| 2009/0132467 | A1 | 5/2009 | Blewett et al. |
| 2010/0257129 | A1 | 10/2010 | Lyon et al. |
| 2010/0303342 | A1* | 12/2010 | Berg ................. G06F 16/583 382/155 |
| 2013/0129188 | A1 | 5/2013 | Zhang |
| 2013/0321570 | A1* | 12/2013 | Ferren ............. G06K 9/3266 348/42 |
| 2014/0044349 | A1* | 2/2014 | Wang ............... G06F 16/5838 382/162 |
| 2014/0205206 | A1 | 7/2014 | Datar |
| 2014/0219579 | A1 | 8/2014 | Lischinski et al. |
| 2014/0254922 | A1 | 9/2014 | Wang |
| 2015/0006443 | A1 | 1/2015 | Rose |
| 2015/0012800 | A1 | 1/2015 | Yang et al. |
| 2015/0117784 | A1 | 4/2015 | Lin |
| 2015/0310303 | A1 | 10/2015 | Andreopoulos |
| 2015/0324655 | A1 | 11/2015 | Chalasani |
| 2016/0063734 | A1* | 3/2016 | Divakaran ......... G06K 9/6202 382/110 |

OTHER PUBLICATIONS

Hou et al., "Saliency Detection: A Spectral Residual Approach" (Year: 2007).*

G. Georgiadis, A. Ayvaci, and S. Soatto, "Actionable Saliency Detection: Independent Motion Detection Without Independent Motion Estimation," in Proc. of CVPR, 2012, pp. 646-653.

R. Girschick, J. Donahue, T. Darrell, and J. Malik, "Rich feature hierarchies for accurate object detection," in Proc. of CVPR, 2014, pp. 580-587.

K. Kim, T. Chalidabhongse, D. Harwood, L. Davis, "Real-time foreground—background segmentation using codebook model", Real-time Imaging, vol. 11, No. 3, pp. 172-185, 2005.

Stanford Hoover Tower images from the DARPA Neovision2 data-set (approved for public release: DISTAR case 21306), pp. 1-2, copyright 2013, downloaded on May 21, 2018, found at http://ilab.usc.edu/neo2/dataset/.

A. Krizhevsky, I. Sutskever, and G. E. Hinton, "ImageNet Classification with Deep Convolutional Neural Networks," in Proceedings of Neural Information Processing Symposium, 2012, pp. 1-9.

Shibata, T., Zhang, R., Levitan, S. P., Nikonov, D. E., & Bourianoff, G. I. (2012). CMOS supporting circuitries for nano-oscillator-based associative memories. In 2012 13th International Workshop on Cellular Nanoscale Networks and Their Applications (CNNA), pp. 1-5.

Levitan, S.P., et al., "Non-Boolean Associative Architectures Based on Nano-Oscillators," Proc. Intl. Workshop on Cellular Nanoscale Networks and their Applications, 2012, pp. 1-6.

Levitan, S. P., Fang, Y., Carpenter, J. A., Gnegy, C. N., Janosik, N. S., Awosika-Olumo, S., . . . & Porod, W. (2013). Associative processing with coupled oscillators. In ISLPED, p. 235.

Sermanet, P., Eigen, D., Zhang, X., Mathieu, M., Fergus, R., & LeCun, Y. (2014). Overfeat: Integrated recognition, localization and detection using convolutional networks. In International Conference on Learning Representations (ICLR 2014), Apr. 2014, pp. 1-16.

Krizhevsky, A., Sutskever, I., & Hinton, G. E. (2012). Imagenet classification with deep convolutional neural networks. In Advances in neural information processing systems, pp. 1097-1105.

Fang, et al., "Modeling oscillator arrays for video analytic applications," IEEE/ACM International Conference on Computer-Aided Design (ICCAD), 2014, pp. 86-91.

Jennings, et al., "HMAX Image Processing Pipeline with Coupled Oscillator Acceleration," IEEE Workshop on Signal Processing Systems (SiPS), 2014, pp. 1-22.

D. Chiarulli, B. Jennings, Y. Fang, A. Seel, and S. Levitan, "A Computational Primitive for Convolution based on Coupled Oscillator Arrays," in Proc. Of ISVLSI, No. 144, pp. 125-130, 2015.

From U.S. Appl. No. 14/202,200 (now U.S. Pat. No. 9,262,843), Notice of Allowance dated Oct. 6, 2015.

Notice of Allowance for U.S. Appl. No. 15/203,596 (not TMA), dated Feb. 13, 2018.

Narayanan, et al., "Video Analytics Using Beyond CMOS Devices," In: Proceedings of the conference on 2014 Design, Automation & Test in Europe, European Design and Automation Association, Mar. 24-28, 2014.

Nikonov, et al., "Convolutional Networks for Image Processing by Coupled Oscillator Arrays," pp. 1-23, Sep. 15, 2014.

From: PCT/US2017/0407791 International Search Report and Written Opinion, dated Oct. 19, 2017.

Pierre Sermanet, David Eigen, Xiang Zhang, Michael Mathieu, Rob Fergus and Yann LeCun: OverFeat: Integrated Recognition, Localization and Detection using Convolutional Networks, International Conference on Learning Representations (ICLR2014), CBLS, Feb. 24, 2014, pp. 1-16.

Serre, T., Oliva, A., & Poggio, T. (2007). A feedforward architecture accounts for rapid categorization. Proceedings of the National Academy of Sciences, 104(15), pp. 6424-6429.

Hoehfeld, M., & Fahlman, S. E. (1992). Learning with Limited Numerical Precision Using the Cascade-Correlation Learning Algorithm. IEEE Transactions on Neural Networks, 3(4), pp. 602-611.

R. Kasturi, D. Goldgof, P. Soundararajan, V. Manohar, J. Garofolo, R. Bowers, M. Boonstra, V. Korzhova, and J. Zhang, "Framework for Performance Evaluation of Face, Text, and Vehicle Detection and Tracking in Video: Data, Metrics, and Protocol," IEEE Transactions on Pattern Analysis and Machine Intelligence, vol. 31, No. 2, Feb. 2009, pp. 319-336.

(56) References Cited

OTHER PUBLICATIONS

International Search Report of the International Searching Authority for PCT/US2016/024017 dated Jul. 6 2016.
The Written Opinion of the International Searching Authority for PCT/US2016/024017 dated Jul. 6, 2016.
Notification of Transmittal of International Search Report and the Written Opinion of the International Searching Authority for PCT/US2016/024017 dated Jul. 6, 2016.
Roberto Rigamonti et al., "Are sparse representations really relevant for image classification?", Computer Vision and Pattern Recognition (CVPR), 2011 IEEE Conference on, In: IEEE, Jun. 25, 2011, pp. 1545-1552.
Notification Concerning Transmittal of International Preliminary Report on Patentability for PCT/US2016/024017 dated Oct. 5, 2017.
International Preliminary Report on Patentability for PCT/US2016/024017 dated Oct. 5, 2017.
Office Action 1 for U.S. Appl. No. 15/079,899, dated Oct. 30, 2018.
Mutch et al., Multiclass Object Recognition wit Sparse, Localized Features, IEEE CVPR '06, 2006. (Year: 2006).
Zeiler, Matthew, Hierarchical Convolutional Deep Learning in Computer Vision, PhD Thesis NYU, Jan 2014. (Year: 2014).
Bengio et al., On the Expressive Power of Deep Architectures, ALT' 11 Proceedings of the 22nd International Conference on Algorithmic learning theory, 2011. (Year: 2011).
Goh et al., Learning Deep Hierarchical Visual Feature Coding, IEEE Transactions on Neural Networks and Learning Systems, vol. 25, Issue: 12, Dec. 2014. (Year: 2014).
Office Action 1 for U.S. Appl. No. 15/272,247 dated Jun. 15, 2018.
Response to Office Action 1 for U.S. Appl. No. 15/272,247, dated Sep. 12, 2018.
A. Fasih, J. Chedjou, and K. Kyamakya, "Ultra Fast Object Counting Based on Cellular Neural Network," in Proc. of INDS, 2008, pp. 1-3.
C. Guo, Q. Ma, and L. Zhang, "Spatio-temporal Saliency detection using phase spectrum of quaternion fourier transform," in Proc. of CVPR, 2008, pp. 1-8.
H.O. Kunz, "On the Equivalence Between One-Dimensional Discrete Walsh-Hadamard and Multidimensional Discrete Fourier Transforms," IEEE Transactions on Computers, 28 (3): pp. 267-8, 1979.
X. Hou and L. Zhang, "Saliency Detection: A Spectral Residual Approach," in Proc. of CVPR, 2007, pp. 1-8.
X. Hou, and C. Koch, "Image Signature: Highlighting Sparse Salient Regions", IEEE TPAMI, 30(1): pp. 194-201, 2012.
L. Itti, C. Koch, and E. Niebur, "A model of saliency-based visual attention for rapid scene analysis," IEEE TPAMI 20(11): pp. 1254-1259, 1998.
S. Levitan, Y. Fang, D. Dash, T. Shibata, D. Nikonov, and G. Bourianoff, "Non-Boolean associative architectures based on nano-oscillators," Proc. of CNNA, 2012, pp. 1-6.
D. Lowe, "Distinctive image features from scale-invariant keypoints," IJCV, 60(2), pp. 91-110, 2004.
J. Mutch, and D. Lowe, "Multiclass Object Recognition with Sparse, Localized Features," in Proc. of CVPR, 2006, pp. 1-8.
M., Riesenhuber, and T. Poggio, "Hierarchical Models of Object Recognition in Cortex," Nature Neuroscience 2: pp. 1019-1025, 1999.

B. Schauerte and R. Stiefelhagen, "Quaternion-Based Spectral Saliency Detection for Eye Fixation Prediction," in Proc. of ECCV, 2012, pp. 116-129.
L., Itti, "Neovision2 annotated video datasets," Stanford Hoover Tower images from the DARPA Neovision2 data-set available at http://ilab.usc.edu/neo2/dataset/. Downloaded Nov. 17, 2016.
R. Walczyk, A. Armitage, and T. Binnie, "Comparative Study of Connected Component Labeling Algorithms for Embedding Video Processing Systems," in Proc. of IPCV, 2010, pp. 107.
Y. Yu, J. Lin, and J. Yang, "Bottom-Up Visual Saliency Using Binary Spectrum of Walsh-Hadamard Transform," in Proc of ICONIP, 2014, pp. 33-41.
"Hadamard transform", http://en.wikipedia.org/wiki/Hadamard_transform. Downloaded Nov. 17, 2016.
Cruz-Albrecht, et al., "A Low-Energy Spike-Domain Convolution Circuit," Senior Member, IEEE, pp. 1-6, 2015.
Srinivasa, N., et al., "Probabilistic inference devices for unconventional processing of signals for intelligent data exploitation," 40th Annu. GOMAC Tech. Conf., 4 pages, 2015.
International Search Report and Written Opinion of the International Searching Authority for PCT/US2016/017895 dated Dec. 16, 2016.
Notice of Allowance for U.S. Appl. No. 15/043,478 (non TMA issued as 9,721,332), dated Mar. 27, 2017.
Communication pursuant to Rules 161(2) and 162 EPC for European Regional Phase Patent Application No. 16769696.2, dated Nov. 6, 2017.
A Response for European Regional Phase Patent Application No. 16769696.2, dated Apr. 30, 2018.
Communication pursuant to Rules 70(2) and 70a(2) EPC; European Search Report comprising the supplementary European Search Report and non-binding European Search Opinion for the application for European Regional Phase Patent Application No. 16769696.2, dated Nov. 8, 2018.
Wang, Qi, et al., "From Maxout to Channel-Out: Encoding Information on Sparse Pathways," In Medical image computing and computer-assisted intervention (MICCAI 2015), 18th international conference, Germany, vol. 8681, pp. 273-280.
Notice of Allowance for U.S. Appl. No. 15/272,247, dated Dec. 14, 2018.
Notification of Transmittal of International Search Report and the Written Opinion of the International Searching Authority for PCT/US2018/026338 dated Mar. 22, 2019.
International Search Report of the International Searching Authority for PCT/US2018/026338 dated Mar. 22, 2019.
Written Opinion of the International Searching Authority for PCT/US2018/026338 dated Mar. 22, 2019.
Li, et al., "Saliency Detection Based on Frequency and Spatial Domain Analysis," Proceedings of the British Machine Vision Conference (BMVC), 2011, pp. 1-11.
Shamsudheen, et al., "Salient region detection based on average saliency map with spatial variance," In: International Journal of Engineering Sciences & Research Technology (IJESRT), Jul. 2016, pp. 1245-1254.
Perazzi, et al., "Efficient Salient Foreground Detection for Images and Video using Fiedler Vectors," In: Eurographics Workshop on Intelligent Cinematography and Editing (WICIED), 2015, pp. 1-9.
Response to Office Action 1 for U.S. Appl. No. 15/079,899, dated Feb. 27, 2019.

* cited by examiner

Conventional Spectral Saliency

| | Ground Truth | # Hits | # Misses |
|---|---|---|---|
| Person | 6724 | 5713 | 1011 |
| Cyclist | 962 | 880 | 62 |
| Car | 870 | 870 | 0 |
| Other | 361 | 351 | 10 |
| Total | 8917 | 7814 | 1083 | of False Detections: 21197
F1 Score: 0.4120

FIG. 6A

Weighted Spectral Saliency

| | Ground Truth | # Hits | # Misses |
|---|---|---|---|
| Person | 6724 | 5836 | 888 |
| Cyclist | 962 | 960 | 2 |
| Car | 870 | 870 | 0 |
| Other | 361 | 361 | 0 |
| Total | 8917 | 8027 | 890 | of False Detections: 8597
F1 Score: 0.6286

FIG. 6B

SYSTEM FOR DETECTING SALIENT OBJECTS IN IMAGES

CROSS-REFERENCE TO RELATED APPLICATIONS

This is a Continuation-in-Part application of U.S. Non-Provisional application Ser. No. 15/272,247, filed on Sep. 21, 2016, which is a non-provisional application of U.S. Provisional Application No. 62/221,550, filed on Sep. 21, 2015, the entirety of which are hereby incorporated by reference.

U.S. Non-Provisional application Ser. No. 15/272,247 is also a Continuation-in-Part application of U.S. application Ser. No. 15/079,899, filed in the United States on Mar. 24, 2016, entitled, "Sparse Inference Modules for Deep Learning," which is a Non-Provisional application of U.S. Provisional Application No. 62/137,665, filed in the United States on Mar. 24, 2015. U.S. application Ser. No. 15/079,899 is also a non-provisional application of U.S. Provisional Application No. 62/155,355, filed in the United States on Apr. 30, 2015, which is incorporated herein by reference in its entirety.

U.S. Non-Provisional application Ser. No. 15/272,247 is also a Continuation-in-Part application of U.S. application Ser. No. 15/043,478, filed in the United States on Feb. 12, 2016, and which issued as U.S. Pat. No. 9,721,332 on Aug. 1, 2017, which is incorporated herein by reference in its entirety. U.S. Non-Provisional application Ser. No. 15/272,247 is ALSO a Continuation-in-Part application of U.S. application Ser. No. 15/203,596, filed in the United States on Jul. 6, 2016, which is incorporated herein by reference in its entirety.

The present application is also a non-provisional patent application of U.S. Provisional Application No. 62/516,504, filed on Jun. 7, 2017, the entirety of which is hereby incorporated by reference.

GOVERNMENT RIGHTS

This invention was made with government support under U.S. Government Contract Number HR0011-13-C-0052, Revolutionary Analog Probabilistic Inference Devices for Unconventional Processing of Signals for Data Exploitation (RAPID-UPSIDE). The government has certain rights in the invention.

BACKGROUND OF INVENTION

(1) Field of Invention

The present invention relates to an object recognition system and, more specifically, to system for detecting salient objects in images in a wide-area scene taken from a stationary or moving camera.

(2) Description of Related Art

Object detection systems are used in a variety of applications and implemented using a number of different techniques. Saliency systems, for example, are largely directed to detecting an object based on the saliency of the object within a particular image. Conventional spectral saliency systems, such as those described in Literature Reference Nos. 3-5, 8 and 10 (see the List of Incorporated Literature References) are designed to predict where in an image a person's eyes will cast their gaze before they have time to focus their attention on the image; a task known as the "preattentive human gaze prediction" problem. Such spectral saliency systems find objects of interest by detecting aperiodic edges in the spectral domain that correspond to salient object boundaries. When such systems are applied for detecting objects in wide-area images (that have potentially many objects in them and thus multiple points of attention), they can often detect salient objects, but also find background objects, such as street curbs and signposts that are often not relevant. In a conventional spectral saliency system, there is no way to specify what are the foreground objects that the user is interested in detecting.

Alternatively, one can use a learning-based object detection system, such as that as described by Girshick in Literature Reference No. 2. Such systems use a state-of-the-art machine learning algorithm (e.g., deep learning) to classify image patches as foreground or background, and then use a region proposal algorithm to efficiently scan over all image patch locations and sizes without resorting to an exhaustive sliding window-type approach. Because they incorporate an annotated training set, such systems can be trained to be highly accurate. However, the region proposal system still requires orders of magnitude more computation than spectral saliency systems. Thus, it is not feasible to implement such learning-based object detection systems on low size, weight, and power (SWaP) platforms with limited computational resources.

Thus, a continuing need exists for an object detection system that leverages the benefits of both learning-based object detection systems and conventional spectral saliency systems.

SUMMARY OF INVENTION

This disclosure is directed to a system for detecting salient objects in images. In various aspects, the system includes one or more processors and a memory. The memory is a non-transitory computer-readable medium having executable instructions encoded thereon, such that upon execution of the instructions, the one or more processors perform several operations. During operation, the system maps an input image into a frequency domain having a spectral magnitude. The spectral magnitude is replaced with weights from a weight matrix W. The frequency domain is then transformed with the weights to a saliency map in the image domain, the saliency map having pixels with pixel values. A squaring operation is then performed on the saliency map by squaring the pixel values to generate a pixel-value altered saliency map. A final saliency map is generated by filtering the pixel-value altered saliency map.

In another aspect, the system performs an operation of controlling a device based on the saliency map.

In yet another aspect, the system performs operations of designating a region within the final saliency map as an object; and causing an autonomous vehicle to perform a maneuver to avoid collision with the object.

Further, in filtering the pixel-value altered saliency map, salient edges within the pixel-value altered saliency map are blurred into salient regions.

In yet another aspect, the system performs operations of classifying an object within the final saliency map; and displaying the classification on a display device.

Additionally, the system generates the weight matrix W, such that the weight matrix W is a foreground weight matrix F divided by the background weight matrix B, wherein the foreground weight matrix F is an average spectral magnitude of foreground regions from a training set, and wherein the background weight matrix B is an average spectral magnitude of background images.

In yet another aspect, the system performs an operation of sending the final saliency map to a cell phone or central monitoring facility.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 6A is a chart depicting performance of a conventional spectral saliency system;

FIG. 6B is a charge depicting performance of a weighted spectral saliency system according to various embodiments of the present invention;

DETAILED DESCRIPTION

Figure 1:
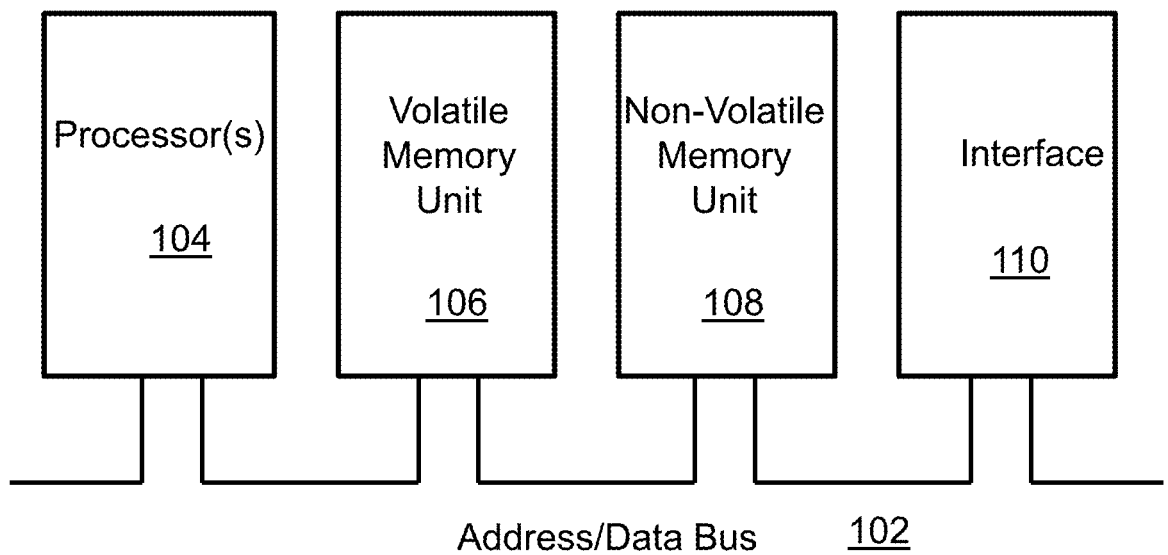
FIG. 1 is a block diagram depicting the components of a system according to various embodiments of the present invention.
Figure 1:
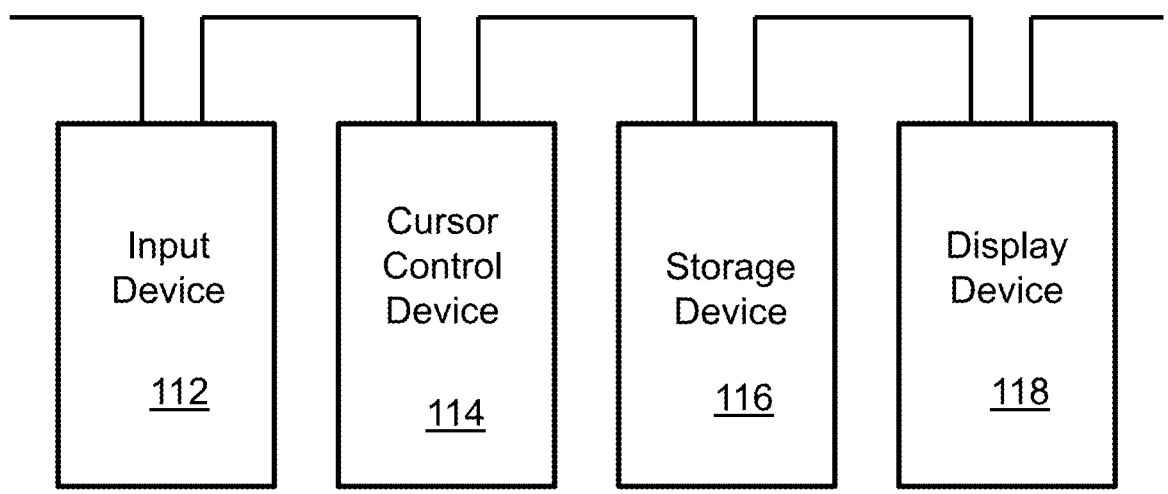

The present invention relates to an object recognition system and, more specifically, to system for detecting salient objects in images in a wide-area scene taken from a stationary or moving camera. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. G. Georgiadis, A. Ayvaci, and S. Soatto, "Actionable Saliency Detection: Independent Motion Detection Without Independent Motion Estimation," in Proc. of CVPR, 2012.
2. R. Girschick, J. Donahue, T. Darrell, and J. Malik, "Rich feature hierarchies for accurate object detection," in Proc. of CVPR, 2014.
3. C. Guo, Q. Ma, and L. Zhang, "Spatio-temporal Saliency detection using phase spectrum of quaternion fourier transform," in Proc. of CVPR, 2008.
4. X. Hou and L. Zhang, "Saliency Detection: A Spectral Residual Approach," in Proc. of CVPR, 2007.
5. X. Hou, and C. Koch, "Image Signature: Highlighting Sparse Salient Regions", IEEE TPAMI, 30(1):194-201, 2012.

6. K. Kim, T. Chalidabhongse, D. Harwood, L. Davis, "Real-time foreground-background segmentation using codebook model", Real-time Imaging, vol 11, no. 3, pp 172-185, 2005.
7. U.S. patent application Ser. No. 15/272,247, filed on Sep. 21, 2016, entitled, "Wide Area Salient Object Detection Architecture for Low Power Hardware Platforms".
8. B. Schauerte and R. Stiefelhagen, "Quaternion-Based Spectral Saliency Detection for Eye Fixation Prediction," in Proc. of ECCV, 2012.
9. Stanford Hoover Tower images from the DARPA Neovision2 data-set (approved for public release: DISTAR case 21306), found at http://ilab.usc.edu/neo2/dataset/.
10. Y. Yu, J. Lin, and J. Yang, "Bottom-Up Visual Saliency Using Binary Spectrum of Walsh-Hadamard Transform," in Proc. of ICONIP, 2014.
11. A. Krizhevsky, I. Sutskever, and G. E. Hinton, "ImageNet Classification with Deep Convolutional Neural Networks," in Proceedings of Neural Information Processing Symposium, 2012.

(2) PRINCIPAL ASPECTS

Various embodiments of the invention include three "principal" aspects. The first is a system for detecting salient objects in images. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
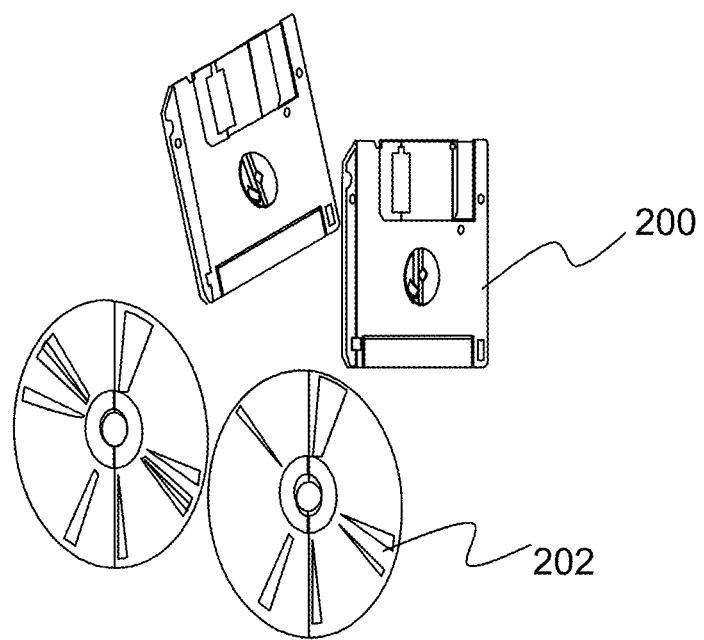
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

This disclosure provides a system for detecting salient objects in images in a wide-area scene taken from a stationary or moving camera. The system is a "spectral saliency system" that applies a spectral transformation to an input image to obtain features useful for saliency from the spatial frequencies of the image pixel intensities. The system makes use of annotated training images to learn a weight matrix that amplifies the saliency signature of foreground objects of interest while suppressing background objects.

The system of this disclosure greatly improves the accuracy of image processing pipelines for object detection and recognition. By amplifying the saliency signature of foreground objects while attenuating the signatures of background objects, the system is able to greatly reduce the number of false alarms generated by the object detection system. This reduction in false alarms, in turn, improves the overall object recognition performance by reducing the number of background objects that can be misclassified as foreground objects of interest. The described system also reduces the amount of computation used by the object recognition system, by reducing the number of detected objects that the object recognition system has to process. The described system is also amenable for efficient implementation on systems with low size, weight and power (SWaP) that have limited computational power, because only additional computation required over a conventional spectral saliency system is an element-wise multiplication by a weight matrix.

The system leverages the benefits of both learning-based object detection systems and conventional spectral saliency systems. In doing so, the system incorporates knowledge of foreground and background objects from annotated training sets, similar to learning-based object detection systems, but only uses slightly more computation than a conventional spectral saliency system. Thus, the system described herein is the first such system that integrates a learned weight matrix into a spectral saliency system. Further details are provided below.

(4) SPECIFIC DETAILS OF VARIOUS EMBODIMENTS

Figure 3:
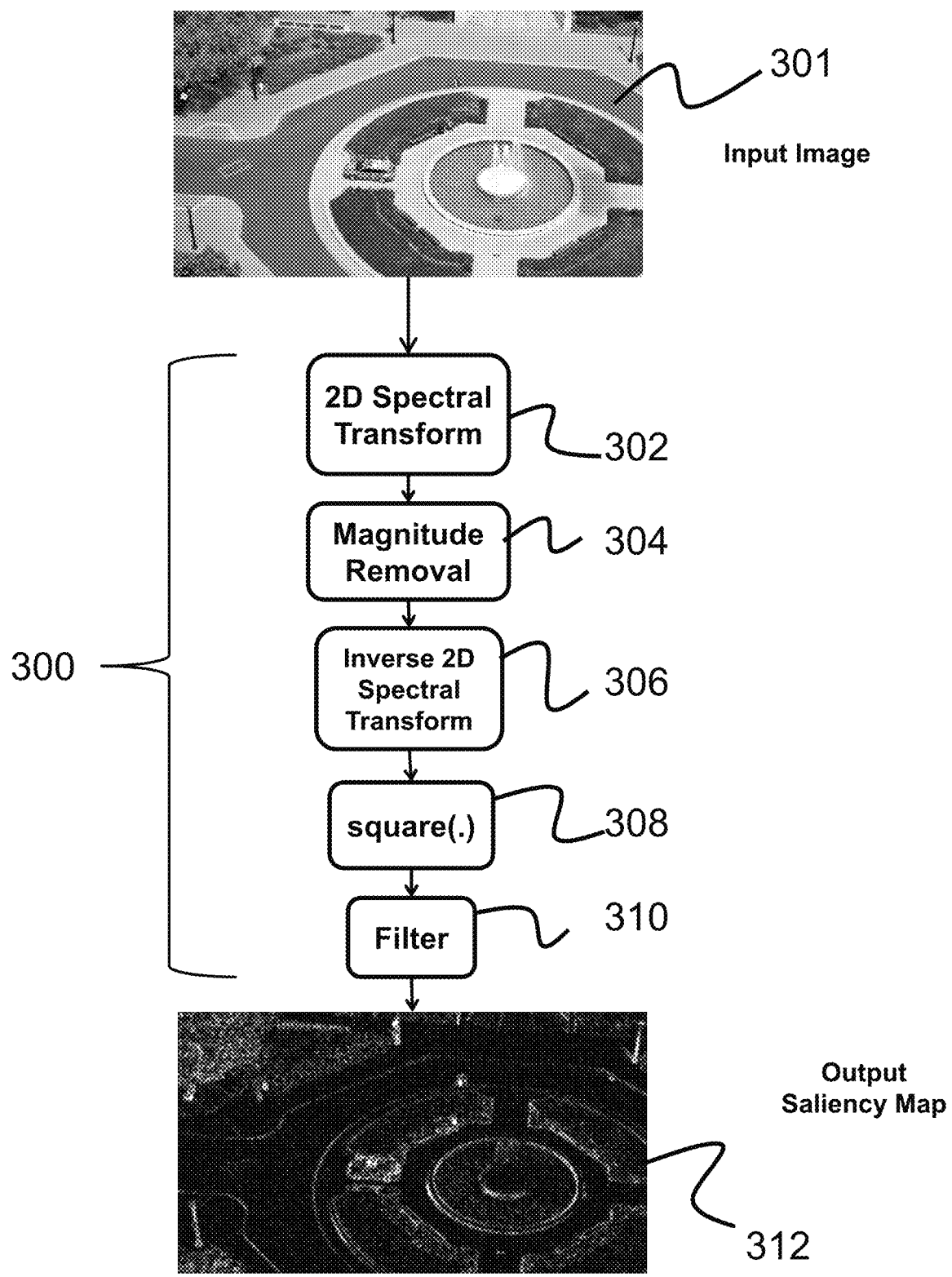
FIG. 3 is an illustration depicting an architecture of a spectral saliency system for detecting salient objects in images.

As noted above, the present disclosure provides a weighted spectral saliency system. Before describing the present system, provided below is a brief description of a conventional spectral saliency system. Specifically, and as shown in FIG. 3, a conventional spectral saliency module 300 consists of a 2D spectral transformation 302, followed by a magnitude removal step 304, then the corresponding inverse 2D spectral transformation 306, a squaring step 308, and finally a filtering 310 step.

Nonlimiting examples of spectral saliency systems that use this architecture include the Spectral Residual (SR) method of Hou (see Literature Reference No. 4), the Phase Fourier Transform (PFT) method and Image Signature (IS) method of Hou (see Literature Reference No. 5) and the Walsh-Hadamard Transfrom (WHT) method of Yu (see Literature Reference No. 10). The spectral transform 302 maps the input image 301 into the frequency domain. The SR and PFT methods use the Fast Fourier Transform (FFT), while the IS method uses the Discrete Cosine Transform (DCT) and the method of Yu used the Walsh-Hadamard Transform (WHT). The magnitude removal module 304 removes the magnitude from the transformed image, as saliency information in the image is in general invariant to the spectral magnitude, and thus the magnitude information is a nuisance factor with respect to saliency. For the PFT method, the magnitude is removed by taking the phase of each element of the transformed image. For the DCT and WHT methods, because the transformed image is real-valued, the magnitude is removed by applying the element-wise sign(.) operation that maps positive values to +1, negative values to −1, and zero values to 0. For the Spectral Residual or SR method, the spectral magnitude is attenuated by subtracting an average filtered version of the log magnitude of the spectrum from itself:

$$D(f)=\exp(h_n*\log(|f|)+\angle f).$$

Here f is the FFT of the input image, $$h_n = \begin{bmatrix} \left(1-\frac{1}{n}\right) & -\frac{1}{n} & \cdots & -\frac{1}{n} \\ -\frac{1}{n} & \left(1-\frac{1}{n}\right) & \cdots & \vdots \\ \vdots & \vdots & \ddots & -\frac{1}{n} \\ -\frac{1}{n} & \cdots & -\frac{1}{n} & \left(1-\frac{1}{n}\right) \end{bmatrix}$$

is the n×n filter convolution kernel that computes the difference between the original image and n×n mean-filtered version of the image, and |f| and ∠f are the magnitude and phase of f.

The inverse spectral transformation 306 maps the spectrum back to the image domain after removing the spectral magnitude, resulting in the aperiodic edge boundaries of salient objects to be strengthened, while the smooth changing intensity gradients and periodic textures are filtered out. The squaring operation 308 is then performed, which makes all values in the saliency map nonnegative and makes large saliency values larger and smaller saliency values smaller. The filtering operation 310 blurs the map by converting salient edges into salient regions to generate the resulting saliency map 312.

This saliency map 312 can be used to measure the relative saliency of pixels in the input image 301 and can also be thresholded to distinguish salient pixels from background pixels. As a non-limiting example, a popular adaptive threshold used (see Literature Reference Nos. 3-5 and 8) is to declare a pixel salient if its saliency value is greater than three times the average saliency value in the saliency map image. The identification of salient pixels can then be used by state-of-the-art object recognition systems to easily identify or classify objects within the input image 301. A non-limiting example of such an object recognition systems is a convolutional neural network (CNN) (see, for example, Literature Reference No. 11). While somewhat operable, conventional saliency systems that do not incorporate prior knowledge about objects of interest results in limited accuracy and high false alarms rates in object detection and recognition systems.

Figure 5:
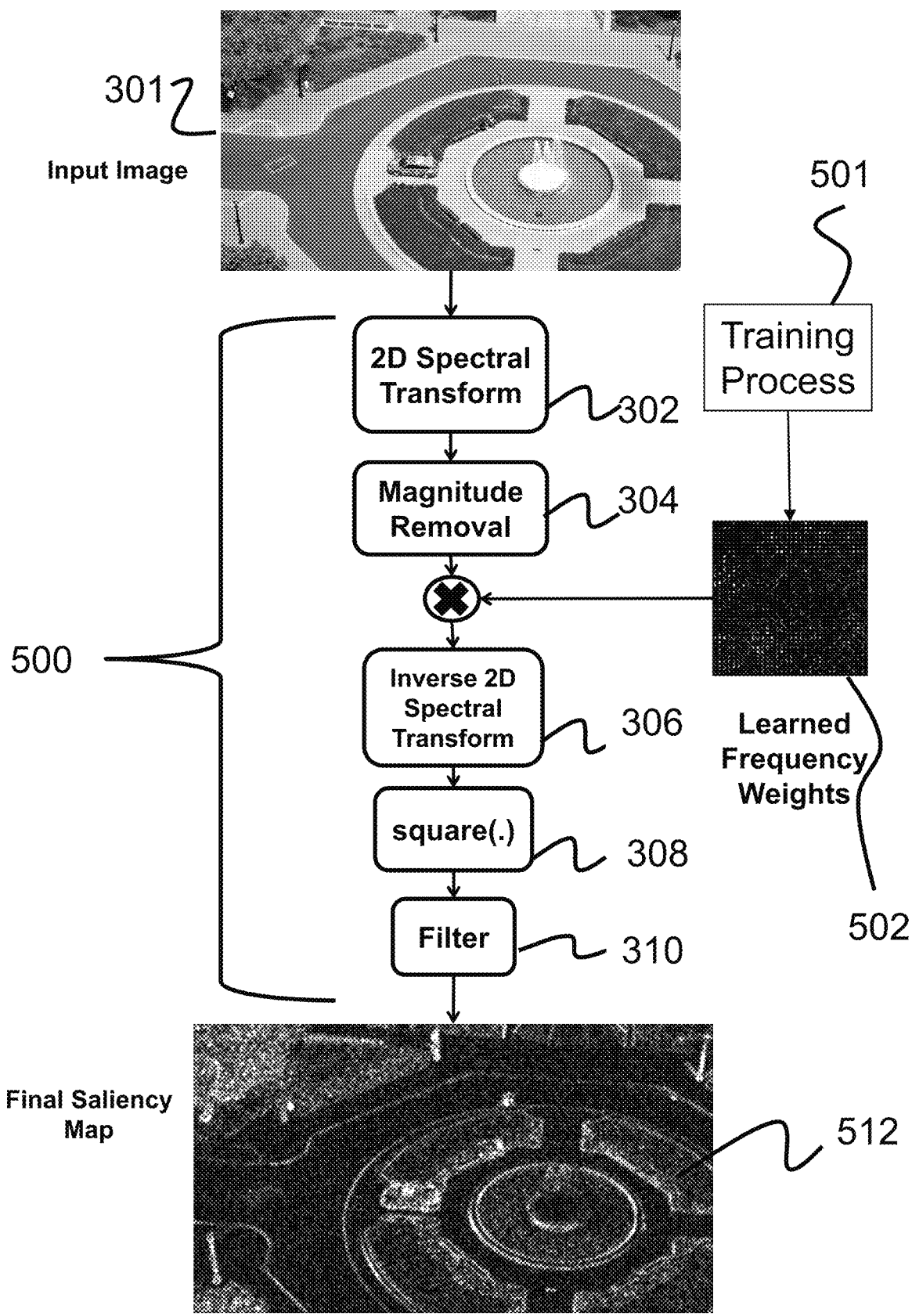
FIG. 5 is an illustration depicting an architecture of a weighted spectral saliency system according to various embodiments of the present invention.

To be contrasted with conventional saliency systems, the system of the present disclosure incorporates several added features to dramatically improve the resulting saliency map. Notably and as shown in FIG. 5, the weighted saliency system 500 of the present disclosure incorporates a weight matrix W 502 into the pipeline just after the magnitude removal 304 operation.

Figure 4A:
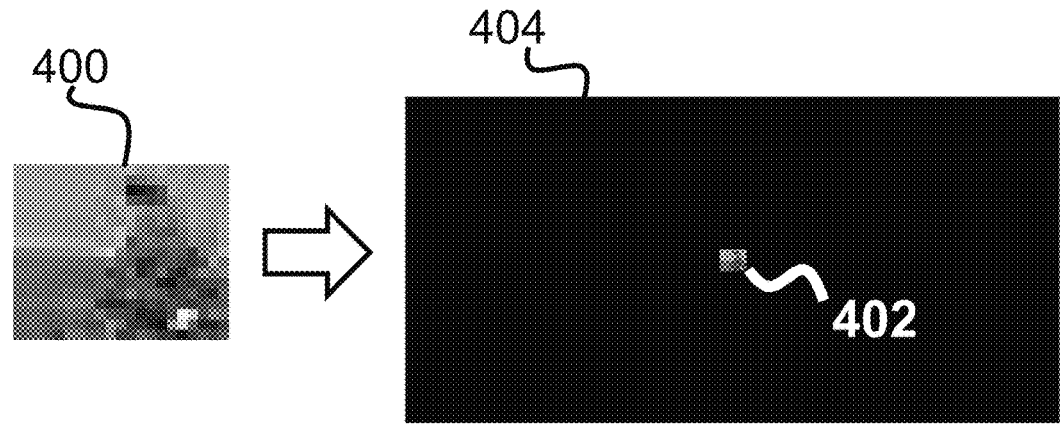
FIG. 4A is an illustration depicting a full-size foreground image as constructed from a foreground patch.

Before performing image analysis on the input image 301, the weighted saliency system 500 performs a training process 501 in which a set of training images are labeled with bounding boxes around foreground objects of interest, such as cars, pedestrians, and cyclists. Using these training images, the weighted saliency system 500 computes an average spectral magnitude F for the set of foreground objects and an average spectral magnitude for the background B. As shown in FIG. 4A, for each bounding box of a foreground object in the training set, the present system constructs a foreground image 400 by placing the foreground image patch 402 in the center of an all-black image 404 that is the same size as the images in the training image set. Then, for each of these foreground images 400, a spectral transformation (e.g., FFT, DCT, or WHT) is applied. The system then computes the average of the magnitude of all such spectral foreground images.

In various embodiments, the FFT of an image is complex-valued, and so each pixel of the FFT image has a magnitude and phase. Computing the magnitude of an FFT image thus removes the phase from each FFT pixel, making them real-valued and non-negative. In various embodiments, for both the DCT and WHT of an image, the transformed image is not complex-valued, but can have negative values. Thus, taking the magnitude of the DCT or WHT transformed images is equivalent to taking the absolute value of each transformed pixel.

Figure 4B:
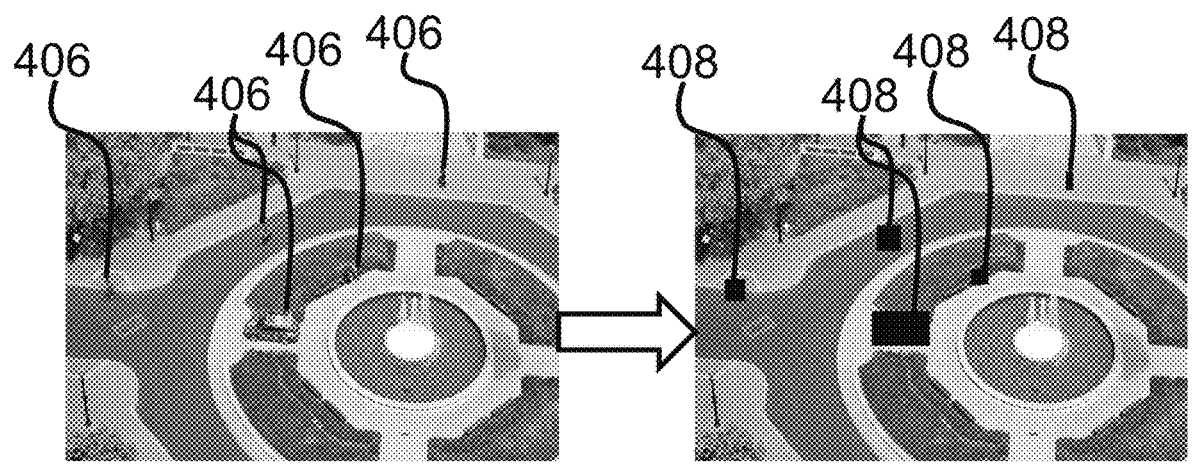
FIG. 4B is an illustration of a background image obtained by blacking out all foreground objects in the image.

In the example that was reduced to practice, to construct the background images, in each training image, a black rectangle 408 (or other masking feature) is placed at the location of each foreground object 406 (see FIG. 4B). While this is not optimal (it introduces spurious high frequencies due to the abrupt transition from scene imagery to all black), as the reduction to practice demonstrated, it is reasonably effective. Alternatively, one could use a method for background modeling, such as that described by Kim et al. (see Literature Reference No. 6), that removes all moving objects from a static scene, or that as described by Georgiadis et al. (see Literature Reference No. 1) that removes all objects that move differently from the dominant motion in the scene. However, such methods will not remove stationary objects from the image. Alternatively, one could replace the 'average' statistic with another statistic, such as the 'median' or 'maximum', in order to make the foreground and background spectral images be robust to certain kinds of outliers.

Given the average spectral magnitudes of the foreground F and background B, the weighted saliency system 500 constructs a weight matrix 502 that is used to magnify frequencies that are present in the foreground while attenuating frequencies present in the background. The weight matrix W 502 is constructed as W=FØB, where Ø is the matrix element-wise division operation.

In other words, the weight matrix W 502 is the foreground weight matrix F divided by the background weight matrix B. The foreground weight matrix F is the average (or median) spectral magnitude of the foreground regions from the training set, and the background weight matrix B is the average (or median) spectral magnitude of the background images that are constructed in one of the ways specified above.

As noted above, the weight matrix W 502 is then incorporated into the pipeline just after the magnitude removal 304 operation. Thus, the original input image's 301 spectral magnitudes, which were shown by Hou et al. (see Literature Reference No. 5) to be irrelevant for saliency, are replaced with weights that strengthen frequencies that are more abundant in foreground objects and attenuate frequencies that are more present in the background. The removal process 304 is implemented by dividing each pixel in the spectral image by its magnitude. The circle with an X in it (as shown in FIG. 5) is meant to be the operation of element-wise multiplication, as each pixel in the spectral image is multiplied by its frequency weight. The rest of the spectral saliency pipeline remains the same.

In other words, instead of simply removing the spectral magnitude, the system 500 replaces the spectral magnitude with the weights from the weight matrix W 502 and then performs an inverse spectral transformation 306 that maps the spectrum back to the image domain, resulting in the aperiodic edge boundaries of salient objects to be strengthened, while the smooth changing intensity gradients and periodic textures are filtered out. The inverse spectral transformation transforms the frequency domain with the weights to a saliency map in the image domain. Such a saliency map has pixels with pixel values.

The specific technique for performing the inverse spectral transformation 306 can vary. More specifically, the inverse spectral transformation 306 depends on which spectral transformation was used during the 2D spectral transformation 302. For example, if one uses the Fourier Transform similar to Hou et al. (see Literature Reference No. 4), then the inverse spectral transformation 306 would be the inverse Fourier transform. Similarly, if one instead chooses to use the Discrete Cosine Transform similar to Hou et al. (see Literature Reference No. 5), the inverse spectral transformation would be the inverse Cosine Transform.

The squaring operation 308 is then performed by squaring the values of pixels to generate a pixel-value altered saliency map. After the squaring operation, all values in the saliency map are made nonnegative, while relatively large saliency map values are made larger and relatively smaller saliency values are made smaller. The relative saliency values are a property of the squaring operation. In general, a squaring operation makes values less than 1 smaller and values greater than 1 larger. However, even in the case that all values are above 1 or below 1, the relative size of the larger values gets bigger and the relative size of the smaller values gets smaller after a squaring operation has been applied.

A filtering operation 310 is then performed to generate the resulting or final saliency map 512. Any suitable filtering technique may be employed to further enhance salient regions. For example, the system proceeds to blur the map by converting salient edges into salient regions to generate the final saliency map 512 which can be used for further processing and/or object recognition by any suitable object detector system.

(4.1) Reduction to Practice

To demonstrate benefits of the disclosed weighted saliency system, the performance of the disclosed system was compared with that of a conventional spectral saliency system for the task of wide-area object detection. The wide area object detection architecture as described by Rao (see Literature Reference No. 7) was used, with the object detection performance being evaluated using sequences from the Stanford Tower stationary camera video sequence dataset (see Literature Reference No. 9). A representative sequence of 900 image frames from the Tower training set were used to learn the weight matrix required by the weighted saliency system (of the present disclosure). The object detection performance for the conventional, unweighted spectral saliency system was compared with the disclosed weighted saliency system using an example test sequence of 900 image frames from the Tower testing set. The results are shown in FIGS. 6A and 6B, with FIG. 6A depicting results from a conventional spectral saliency system, and with FIG. 6B providing results from the weighted saliency system. The system of the present disclosure detects more of the objects of interest while reducing the number of false detections by a factor of more than 2x.

Figure 7A:
FIG. 7A is an illustration depicting an input image for processing by both a conventional spectral saliency system and a weighted spectral saliency system according to various embodiments of the present invention.
Figure 7B:
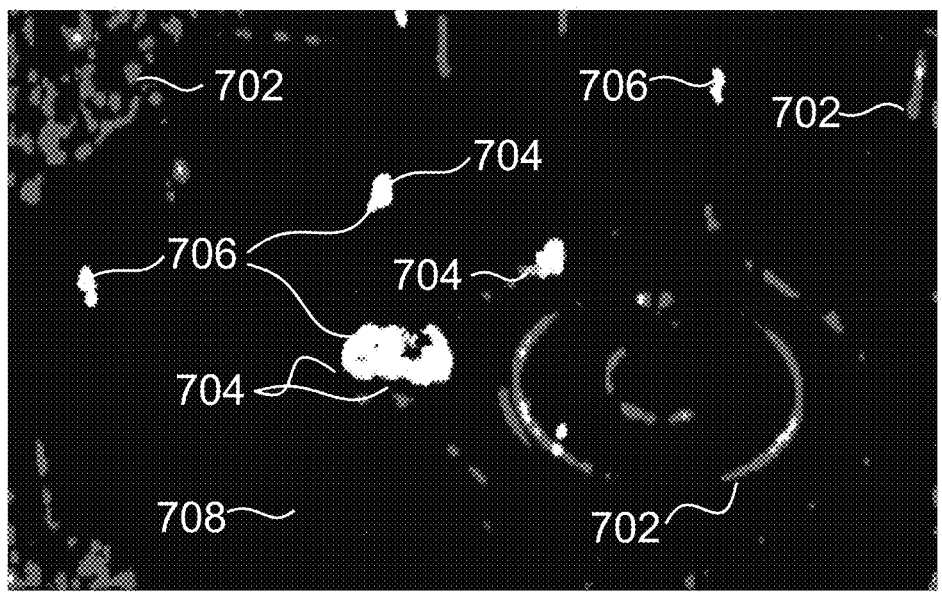
FIG. 7B is an illustration depicting a comparison of results of a conventional spectral saliency system and a weighted spectral saliency system as run on the image as depicted in FIG. 7A.

The performance of the present system was also qualitatively compared against a conventional spectral saliency system. FIG. 7A depicts an example test image frame from the Stanford Tower dataset. Both a conventional spectral saliency system and the weighted saliency system were applied to this image frame, with difference in performance results being depicted in FIG. 7B. Red pixels 702 are detected only as salient by the conventional spectral saliency system, green pixels 704 are detected as salient only by the weighted saliency system, white pixels 706 are detected as salient by both systems, and black pixels 708 are detected as salient by neither. As shown, although the present system (i.e., the weighted saliency system) detects slightly more salient object pixels compared to the conventional system, the present system also ignores most of the background pixels that the conventional system incorrectly classifies as salient. Thus, it is clear that the weighted saliency system according to the present disclosure greatly increases the accuracy of detecting saliency of objects within images.

(4.5) Control of a Device

Figure 8:
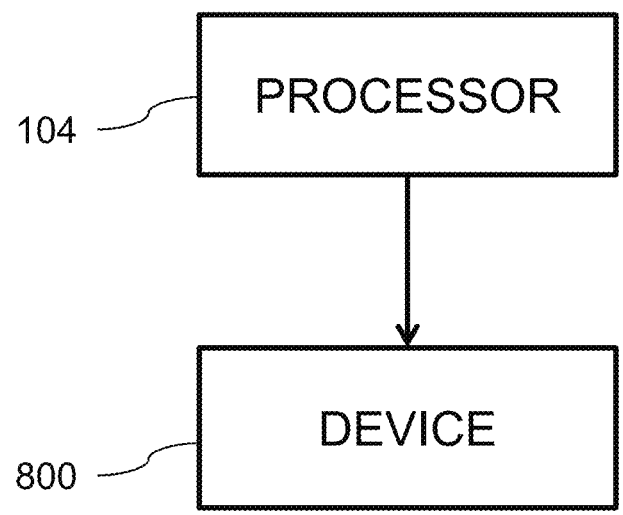
FIG. 8 is a block diagram depicting control of a device according to various embodiments.

As shown in FIG. 8, the processor 104 may be used to control a device 800 (e.g., a mobile device display, a virtual reality display, an augmented reality display, a computer monitor, a motor, a machine, a drone, a camera, a cell phone, a central monitoring system, a transmission system, etc.) based on the saliency map. In some embodiments, the device 800 can receive or send alerts and/or tweets comprising a saliency map, object detection, time, and image or video to a user's cell phone or a central monitoring station/facility. In some other embodiments, for example, the system described herein is applicable to unmanned autonomous vehicles and platforms that have severely limited size, weight and power (SWAP). Performing rapid detection of mission-relevant targets and obstacles on hardware near a sensor both improves mission responsiveness and reduces the amount of raw sensor data that must be transmitted over constrained communication bandwidths. The system described herein is also applicable to active safety and autonomous driving applications. By performing object detection in low-power, low-cost hardware near the camera, the automobile can more rapidly and robustly detect obstacles in the road, and thus provide more timely warnings to the driver or a prompt automated response to obstacles in autonomous vehicle applications.

For example, the device 800 may be controlled to cause the device to move or otherwise initiate a physical action based on the saliency map. As a non-limiting example, an autonomous vehicle may be caused to initiate a driving maneuver based on the saliency map. For example, if the saliency map indicates that an object (e.g., pedestrian, vehicle, etc.) is in the pathway of a traveling autonomous vehicle, the system can cause the autonomous vehicle to brake or turn or otherwise perform a maneuver to avoid a collision with the object.

In some embodiments, a drone or other autonomous vehicle may be controlled to move to an area where an object is determined to be based on the imagery in the saliency map. In yet some other embodiments, a camera may be controlled to orient (e.g., center) towards the location of an object in the saliency map. In other words, actuators or motors are activated to cause the camera (or sensor) to move or zoom in (or center) on the location where the object is localized. In other embodiments, the processor 104 may be used to render and display the saliency map on a display device.

In some embodiments, the final saliency map can be used to determine candidate object locations, which can then be fed to an object recognition backend that identifies or classifies the detected objects and displays the identifications on a display device or otherwise causes a device to move or operate based on the classification of the objects. For example, an object recognition system (such as a CNN) can receive the final saliency map and, based on the salient pixels in the map and a pretrained database or library, the object recognition system can classify the object. In an autonomous vehicle setting, the autonomous vehicle can be caused to operate based on the classification of the object and the appropriate vehicular maneuver. As a non-limiting example, if the object is classified as a stop sign, the vehicle can be caused to come to a stop at the appropriate location proximate the stop sign.

In some embodiments, the system or method generates a saliency map image where the intensity of each saliency map pixel is proportional to the likelihood that the pixel is part of a salient object. As in U.S. patent application Ser. No. 15/272,247 (see Literature Reference No. 7), the saliency map can be converted to a "detection map" of "detected salient object pixels" by performing an adaptive threshold. For example, a pixel x with intensity $I(x)$ is a detected salient object pixel if $I(x)>3*mu$, where mu is the average intensity of all pixels in the saliency map. The system or method of some embodiments may then group together all spatially contiguous detected saliency object pixels, and for each group obtain the minimal bounding box that contains all pixels within the group. These bounding boxes specify the locations of candidate objects with in the image. The image patches from these bounding box locations can be sent to an image recognition module (see Literature Reference No. 12) that will classify the image patches to one of a set of known object classes, such as 'Person', 'Cyclist', 'Car', 'Truck', or 'Bus.'

In an example embodiment, an autonomous platform may be designed to maintain wide area awareness of objects of a certain class (e.g., "Person"), and ignore other objects in the scene. Using some embodiments of the system and method of this disclosure, the autonomous platform could obtain the center of each bounding box in the image that corresponds to a Person, take the average of these centers, and then move (e.g., rotate and/or translate) so that this average becomes the new center of the field of view.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting salient objects in images, the system comprising:
   one or more processors and a memory, the memory being a non-transitory computer-readable medium having executable instructions encoded thereon, such that upon execution of the instructions, the one or more processors perform operations of:
      mapping an input image into a frequency domain having a spectral magnitude;
      replacing the spectral magnitude with weights from a weight matrix W;
      transforming the frequency domain with the weights to a saliency map in the image domain, the saliency map having pixels with pixel values;
      performing a squaring operation on the saliency map by squaring the pixel values to generate a pixel-value altered saliency map such that all values in the pixel-value altered saliency map are nonnegative;
      generating a final saliency map by filtering the pixel-value altered saliency map; and
      generating the weight matrix W, such that the weight matrix W is a foreground weight matrix F divided by the background weight matrix B, wherein the foreground weight matrix F is an average spectral magnitude of foreground regions from a training set, and wherein the background weight matrix B is an average spectral magnitude of background images.

2. The system as set forth in claim 1, further comprising an operation of controlling a device based on the saliency map.

3. The system as set forth in claim 1, further comprising operations of:
   designating a region within the final saliency map as an object; and
   causing an autonomous vehicle to perform a maneuver to avoid collision with the object.

4. The system as set forth in claim 1, wherein in filtering the pixel-value altered saliency map, salient edges within the pixel-value altered saliency map are blurred into salient regions.

5. The system as set forth in claim 1, further comprising operations of:
   classifying an object within the final saliency map; and
   displaying the classification on a display device.

6. The system as set forth in claim 1, further comprising an operation of sending the final saliency map to a cell phone or central monitoring facility.

7. A system for detecting salient objects in images, the system comprising:
   one or more processors and a memory, the memory being a non-transitory computer-readable medium having executable instructions encoded thereon, such that upon execution of the instructions, the one or more processors perform operations of:
      mapping an input image into a frequency domain having a spectral magnitude;
      replacing the spectral magnitude with weights from a weight matrix W;
      transforming the frequency domain with the weights to a saliency map in the image domain, the saliency map having pixels with pixel values:
      performing a squaring operation on the saliency map by squaring the pixel values to generate a pixel-value altered saliency map such that all values in the pixel-value altered saliency map are nonnegative;
      generating a final saliency map by filtering the pixel-value altered saliency map;
      generating the weight matrix W, such that the weight matrix W is a foreground weight matrix F divided by the background weight matrix B, wherein the foreground weight matrix F is an average spectral magnitude of foreground regions from a training set, and wherein the background weight matrix B is an average spectral magnitude of background images;
      designating a region within the final saliency map as an object;
      classifying an object within the final saliency map;
      displaying the classification on a display device;
      causing an autonomous vehicle to perform a maneuver to avoid collision with the object; and
      wherein in filtering the pixel-value altered saliency map, salient edges within the pixel-value altered saliency map are blurred into salient regions.

8. A computer program product for detecting salient objects in images, the computer program product comprising:
   a non-transitory computer-readable medium having executable instructions encoded thereon, such that upon execution of the instructions by one or more processors, the one or more processors perform operations of:
      mapping an input image into a frequency domain having a spectral magnitude;
      replacing the spectral magnitude with weights from a weight matrix W;
      transforming the frequency domain with the weights to a saliency map in the image domain, the saliency map having pixels with pixel values;
      performing a squaring operation on the saliency map by squaring the pixel values to generate a pixel-value altered saliency map such that all values in the pixel-value altered saliency map are nonnegative;

generating a final saliency map by filtering the pixel-value altered saliency map; and generating the weight matrix W, such that the weight matrix W is a foreground weight matrix F divided by the background weight matrix B, wherein the foreground weight matrix F is an average spectral magnitude of foreground regions from a training set, and wherein the background weight matrix B is an average spectral magnitude of background images.

9. The computer program product as set forth in claim 8, further comprising an operation of controlling a device based on the saliency map.

10. The computer program product as set forth in claim 8, further comprising operations of:

designating a region within the final saliency map as an object; and causing an autonomous vehicle to perform a maneuver to avoid collision with the object.

11. The computer program product as set forth in claim 8, wherein in filtering the pixel-value altered saliency map, salient edges within the pixel-value altered saliency map are blurred into salient regions.

12. The computer program product as set forth in claim 8, further comprising operations of:

classifying an object within the final saliency map; and displaying the classification on a display device.

13. The computer program product as set forth in claim 8, further comprising an operation of sending the final saliency map to a cell phone or central monitoring facility.

14. A computer program product for detecting salient objects in images, the computer program product comprising:

a non-transitory computer-readable medium having executable instructions encoded thereon, such that upon execution of the instructions by one or more processors, the one or more processors perform operations of:

mapping an input image into a frequency domain having a spectral magnitude;

replacing the spectral magnitude with weights from a weight matrix W;

transforming the frequency domain with the weights to a saliency map in the image domain, the saliency map having pixels with pixel values;

performing a squaring operation on the saliency map by squaring the pixel values to generate a pixel-value altered saliency map such that all values in the pixel-value altered saliency map are nonnegative;

generating a final saliency map by filtering the pixel-value altered saliency map;

generating the weight matrix W, such that the weight matrix W is a foreground weight matrix F divided by the background weight matrix B, wherein the foreground weight matrix F is an average spectral magnitude of foreground regions from a training set, and wherein the background weight matrix B is an average spectral magnitude of background images;

designating a region within the final saliency map as an object;

classifying an object within the final saliency map;

displaying the classification on a display device;

causing an autonomous vehicle to perform a maneuver to avoid collision with the object; and wherein in filtering the pixel-value altered saliency map, salient edges within the pixel-value altered saliency map are blurred into salient regions.

15. A method for detecting salient objects in images, the method comprising acts of:

mapping an input image into a frequency domain having a spectral magnitude;

replacing the spectral magnitude with weights from a weight matrix W;

transforming the frequency domain with the weights to a saliency map in the image domain, the saliency map having pixels with pixel values;

performing a squaring operation on the saliency map by squaring the pixel values to generate a pixel-value altered saliency map such that all values in the pixel-value altered saliency map are nonnegative;

generating a final saliency map by filtering the pixel-value altered saliency map; and generating the weight matrix W, such that the weight matrix W is a foreground weight matrix F divided by the background weight matrix B, wherein the foreground weight matrix F is an average spectral magnitude of foreground regions from a training set, and wherein the background weight matrix B is an average spectral magnitude of background images.

16. The method as set forth in claim 15, further comprising an operation of controlling a device based on the saliency map.

17. The method as set forth in claim 15, further comprising operations of:

designating a region within the final saliency map as an object; and causing an autonomous vehicle to perform a maneuver to avoid collision with the object.

18. The method as set forth in claim 15, wherein in filtering the pixel-value altered saliency map, salient edges within the pixel-value altered saliency map are blurred into salient regions.

19. The method as set forth in claim 15, further comprising operations of:

classifying an object within the final saliency map; and displaying the classification on a display device.

20. The method as set forth in claim 15, further comprising an operation of sending the final saliency map to a cell phone or central monitoring facility.

21. A method for detecting salient objects in images, the method comprising acts of:

mapping an input image into a frequency domain having a spectral magnitude;

replacing the spectral magnitude with weights from a weight matrix W;

transforming the frequency domain with the weights to a saliency map in the image domain, the saliency map having pixels with pixel values;

performing a squaring operation on the saliency map by squaring the pixel values to generate a pixel-value altered saliency map such that all values in the pixel-value altered saliency map are nonnegative;

generating a final saliency map by filtering the pixel-value altered saliency map;

generating the weight matrix W, such that the weight matrix W is a foreground weight matrix F divided by the background weight matrix B, wherein the foreground weight matrix F is an average spectral magnitude of foreground regions from a training set, and wherein the background weight matrix B is an average spectral magnitude of background images;

designating a region within the final saliency map as an object;
classifying an object within the final saliency map;
displaying the classification on a display device;
causing an autonomous vehicle to perform a maneuver to avoid collision with the object; and
wherein in filtering the pixel-value altered saliency map, salient edges within the pixel-value altered saliency map are blurred into salient regions.

* * * * *